United States Patent
Mater

(10) Patent No.: US 12,465,121 B1
(45) Date of Patent: Nov. 11, 2025

(54) DENTAL SPLATTER SHIELD

(71) Applicant: Chelsey Mater, Oshawa (CA)

(72) Inventor: Chelsey Mater, Oshawa (CA)

( * ) Notice: Subject to any disclaimer, the term of this patent is extended or adjusted under 35 U.S.C. 154(b) by 720 days.

(21) Appl. No.: 17/567,974

(22) Filed: Jan. 4, 2022

(51) Int. Cl.
*A44C 9/00* (2006.01)
*A61B 90/00* (2016.01)
*A61C 19/00* (2006.01)

(52) U.S. Cl.
CPC ............ *A44C 9/0061* (2013.01); *A61B 90/05* (2016.02); *A61C 19/00* (2013.01)

(58) Field of Classification Search
CPC ....... A44C 9/0061; A61B 90/05; A61C 19/00; A61C 17/00
USPC .......................................................... 128/86
See application file for complete search history.

(56) References Cited

U.S. PATENT DOCUMENTS

| | | | | |
|---|---|---|---|---|
| 4,662,842 A * | 5/1987 | Croll | .................... | A61C 19/00 433/141 |
| 4,701,129 A * | 10/1987 | Hazard | ............... | A41D 13/1184 433/136 |
| 4,701,965 A | 10/1987 | Landis | | |
| 4,967,775 A | 11/1990 | Kaiser | | |
| 5,275,559 A | 1/1994 | Rihel | | |
| 5,458,486 A * | 10/1995 | Ballard | .................. | A61B 1/247 433/30 |
| 5,711,027 A | 1/1998 | Katz | | |
| 5,732,862 A * | 3/1998 | Bull | ..................... | A61C 19/006 433/163 |
| D657,095 S | 4/2012 | Logan | | |
| 11,547,186 B1 * | 1/2023 | Boone | .................. | A44C 9/0084 |
| 2015/0257836 A1 | 9/2015 | Mide | | |
| 2020/0000541 A1 | 1/2020 | Clemens | | |

FOREIGN PATENT DOCUMENTS

| | | | | |
|---|---|---|---|---|
| WO | 2014027119 | | 9/2013 | |
| WO | WO 2021246196 A1 * | 12/2021 | ............... H04R 1/12 |

OTHER PUBLICATIONS

S-Curve (BS-1220 Chemical Resistant Splash Guard, May 14, 2020, https://s-curve.com/product/bs-1220-chemical-resistant-splash-guard/) (Year: 2020).*
WO 2021246196 A1 translated (Year: 2021).*

* cited by examiner

*Primary Examiner* — Ophelia A Hawthorne
*Assistant Examiner* — Michael Milo
(74) *Attorney, Agent, or Firm* — Kyle A. Fletcher, Esq.

(57) ABSTRACT

The dental splatter shield is a guard. The dental splatter shield comprises a guard plate, a finger ring plate, a finger ring structure, a plate cant, a caregiver, and a patient. The caregiver provides therapeutic dental services to the patient. The guard plate, the finger ring plate, and the finger ring structure are combined to form a structure that is worn by a caregiver. The plate cant is a cant formed between the guard plate and the finger ring plate. The structure formed by the guard plate, the finger ring plate, and the finger ring structure forms a fluid impermeable barrier that created a protected space that prevents the caregiver and the patient from exchanging biological fluids.

11 Claims, 4 Drawing Sheets

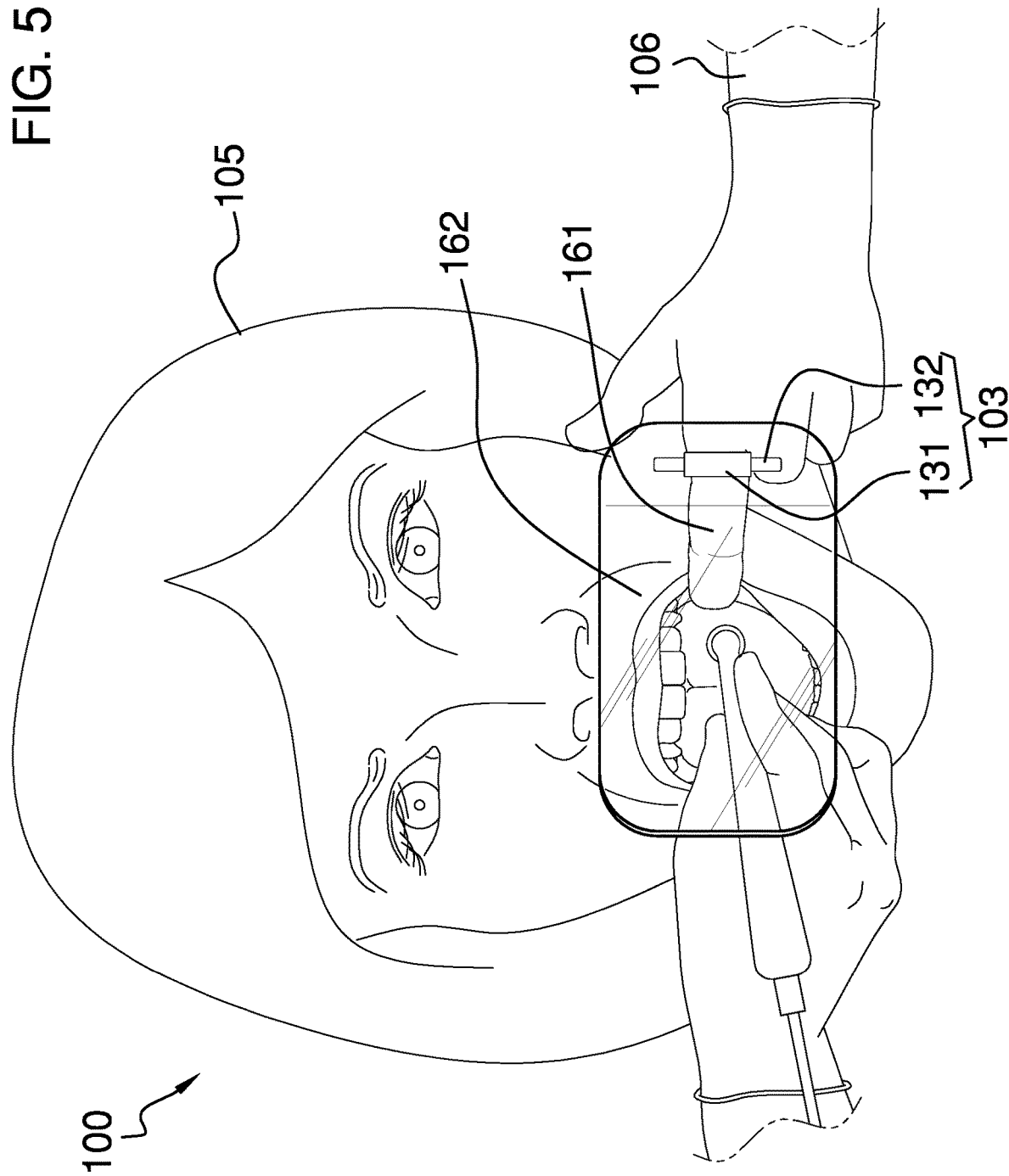

DENTAL SPLATTER SHIELD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field devices for cleaning, polishing, rinsing, or drying teeth. (A61C17/00)

BACKGROUND

The human hand is a grasping structure. The human hand of the left side of the body is a mirror image of the human hand of the right side of the body. The orientation is used to define the palm side of the hand. Specifically, the left hand and the right hand can only be overlaid on top of each other when the palm side of the left hand is touching the palm side of the right hand. The side of the hand opposite to the palm side is referred to as the back side. The human hand is further defined with a thumb (first finger), index finger (second finger), middle finger (third finger), ring finger (fourth finger), and a little finger (fifth finger).

SUMMARY OF INVENTION

The dental splatter shield is a guard. The dental splatter shield comprises a guard plate, a finger ring plate, a finger ring structure, a plate cant, a caregiver, and a patient. The caregiver provides therapeutic dental services to the patient. The guard plate, the finger ring plate, and the finger ring structure are combined to form a structure that is worn by a caregiver. The plate cant is a cant formed between the guard plate and the finger ring plate. The structure formed by the guard plate, the finger ring plate, and the finger ring structure forms a fluid impermeable barrier that created a protected space that prevents the caregiver and the patient from exchanging biological fluids.

These together with additional objects, features and advantages of the dental splatter shield will be readily apparent to those of ordinary skill in the art upon reading the following detailed description of the presently preferred, but nonetheless illustrative, embodiments when taken in conjunction with the accompanying drawings.

In this respect, before explaining the current embodiments of the dental splatter shield in detail, it is to be understood that the dental splatter shield is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dental splatter shield.

It is therefore important that the claims be regarded as including such equivalent construction insofar as they do not depart from the spirit and scope of the dental splatter shield. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
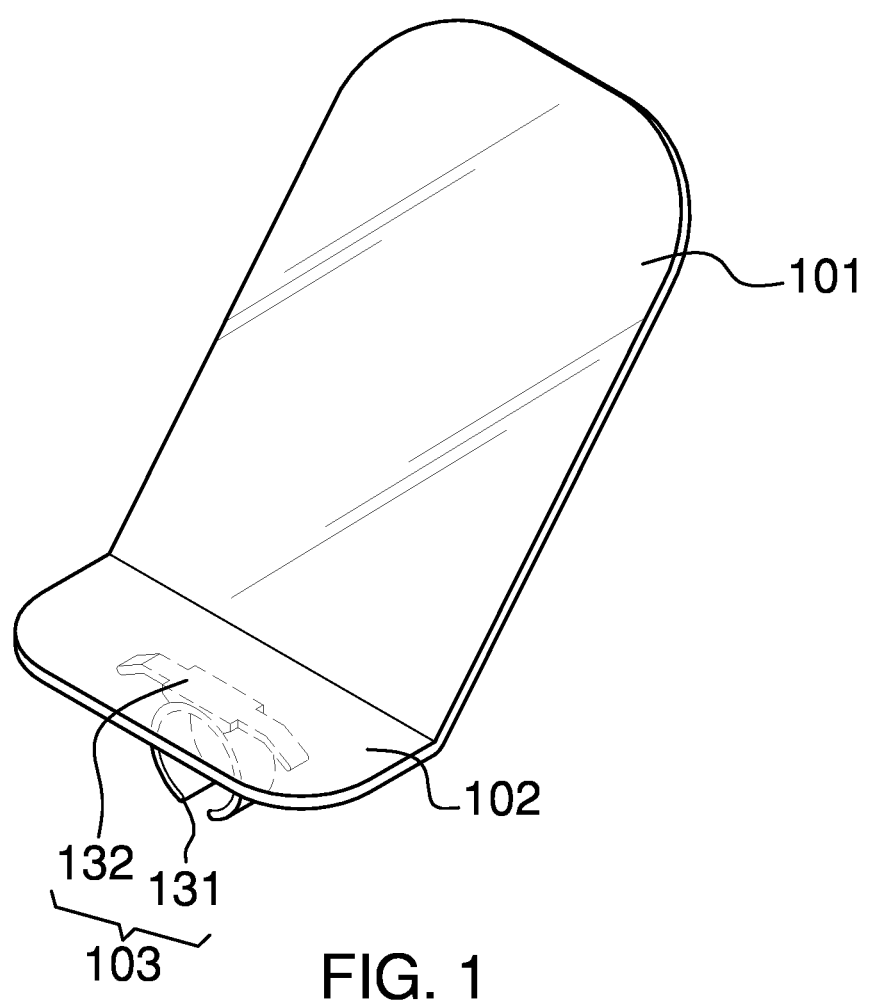
FIG. 1 is a perspective view of an embodiment of the disclosure.
Figure 2:
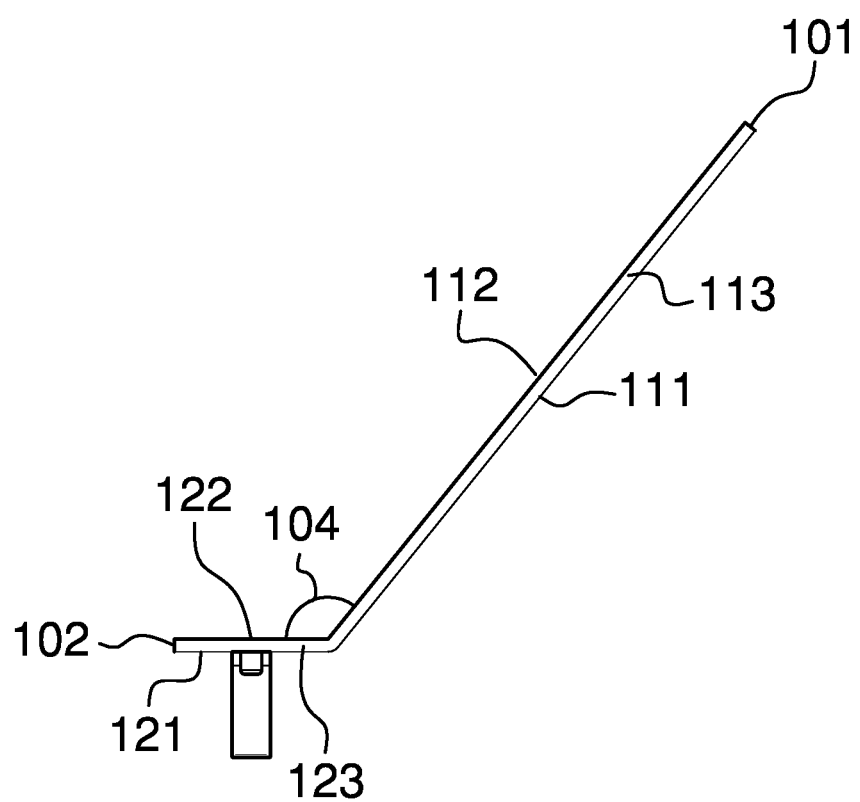
FIG. 2 is a side view of an embodiment of the disclosure.
Figure 3:
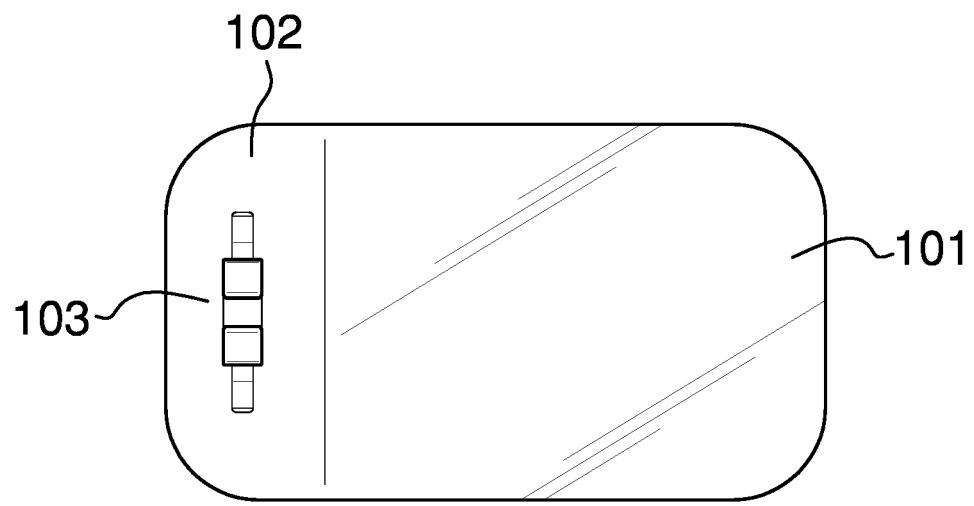
FIG. 3 is a bottom view of an embodiment of the disclosure.
Figure 4:
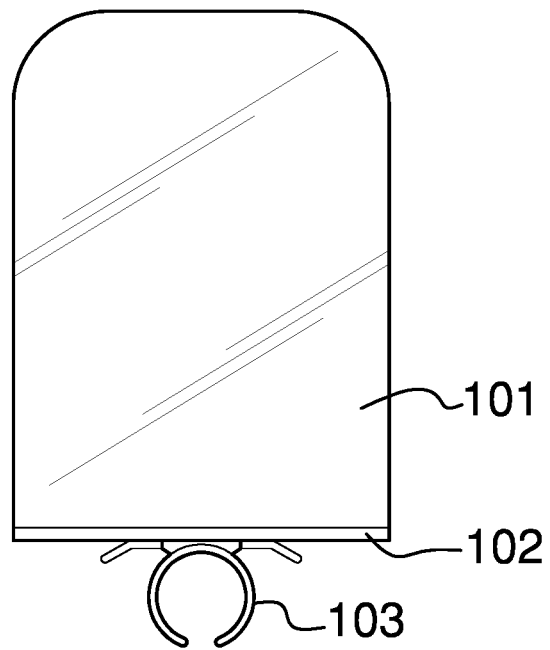
FIG. 4 is a front view of an embodiment of the disclosure.

Detailed reference will now be made to one or more potential embodiments of the disclosure, which are illustrated in FIGS. 1 through 5.

The dental splatter shield 100 (hereinafter invention) is a guard. The invention 100 comprises a guard plate 101, a finger 161 ring 131 plate 102, a finger 161 ring 131 structure 103, a plate cant 104, a caregiver 106, and a patient 105. The caregiver 106 further comprises a finger 161. The patient 105 further comprises a mouth 151. The caregiver 106 provides therapeutic dental services to the patient 105. The guard plate 101, the finger 161 ring 131 plate 102, and the finger 161 ring 131 structure 103 are combined to form a structure that is worn by a caregiver 106. The plate cant 104 is a cant formed between the guard plate 101 and the finger 161 ring 131 plate 102. The structure formed by the guard plate 101, the finger 161 ring 131 plate 102, and the finger 161 ring 131 structure 103 forms a fluid impermeable barrier that created a protected space that prevents the caregiver 106 and the patient 105 from exchanging biological fluids.

The guard plate 101 is a dish shaped structure. The guard plate 101 is a transparent structure. The guard plate 101 forms a barrier between the patient 105 and the caregiver 106. The guard plate 101 forms a portion of the protected space that prevents the caregiver 106 and the patient 105 from exchanging biological fluids. The guard plate 101 comprises a first interior face 111, a first exterior face 112, and a first plurality of lateral faces 113.

The first interior face 111 is a congruent end of the disk structure of the guard plate 101. The first interior face 111 is the face of the disk structure of the guard plate 101 that is proximal to the mouth 151 of the patient 105. The first exterior face 112 is a congruent end of the disk structure of the guard plate 101. The first exterior face 112 is the face of the disk structure of the guard plate 101 that is distal from the mouth 151 of the patient 105. Each lateral face selected from the first plurality of lateral faces 113 forms a portion of the lateral face structure of the disk structure of the guard plate 101.

The finger 161 ring 131 plate 102 is a dish shaped structure. The finger 161 ring 131 plate 102 is a transparent structure. The finger 161 ring 131 plate 102 forms a barrier between the patient 105 and the caregiver 106. The finger 161 ring 131 plate 102 forms a portion of the protected space that prevents the caregiver 106 and the patient 105 from exchanging biological fluids. The finger 161 ring 131 plate 102 comprises a second interior face 121, a second exterior face 122, and a second plurality of lateral faces 123.

The second interior face 121 is a congruent end of the disk structure of the finger 161 ring 131 plate 102. The second interior face 121 is the face of the disk structure of the finger 161 ring 131 plate 102 that is proximal to the mouth 151 of the patient 105. The second exterior face 122 is a congruent end of the disk structure of the finger 161 ring 131 plate 102. The second exterior face 122 is the face of the disk structure of the finger 161 ring 131 plate 102 that is distal from the mouth 151 of the patient 105. Each lateral face selected from the second plurality of lateral faces 123 forms a portion of the lateral face structure of the disk structure of the finger 161 ring 131 plate 102.

The finger 161 ring 131 plate 102 attaches to the guard plate 101 by permanently attaching a second lateral face selected from the second plurality of lateral faces 123 to a first lateral face selected from the first plurality of lateral faces 113.

The finger 161 ring 131 structure 103 is a mechanical structure. The finger 161 ring 131 structure 103 attaches to the second interior face 121 of the finger 161 ring 131 plate 102. The finger 161 ring 131 structure 103 secures the finger 161 ring 131 plate 102 to the second finger 161 of the caregiver 106. The finger 161 ring 131 structure 103 is worn by the caregiver 106 while the caregiver 106 is providing therapeutic dental services to the patient 105. The finger 161 ring 131 structure 103 comprises a finger 161 ring 131 and a plurality of mounting tabs 132.

The finger 161 ring 131 is a disk shaped structure. The finger 161 ring 131 is a ring shaped structure. The finger 161 ring 131 has a semi-enclosed prism shape. The finger 161 ring 131 is a flexible structure. The finger 161 ring 131 is sized such that the second finger 161 of the caregiver 106 inserts through the ring structure of the finger 161 ring 131. The finger 161 ring 131 secures the finger 161 ring 131 plate 102 to the second finger 161 of the caregiver 106. The aperture characteristic of a semi-enclosed prism is formed in the lateral face of the disk structure of the finger 161 ring 131. The characteristic aperture formed in the finger 161 ring 131 combines with the flexible nature of the finger 161 ring 131 to allow the second finger 161 of the caregiver 106 to easily insert through the finger 161 ring 131.

The plurality of mounting tabs 132 forms a fastening device. The plurality of mounting tabs 132 fastens the finger 161 ring 131 to the second interior face 121 of the finger 161 ring 131 plate 102.

The plate cant 104 is an offset with an arc of less than 180 degrees. The plate cant 104 is formed between the first exterior face 112 of the guard plate 101 and the second exterior face 122 of the finger 161 ring 131 plate 102. The offset formed by the plate cant 104 maintains the protected space that prevents the caregiver 106 and the patient 105 from exchanging biological fluids as the finger 161 of the caregiver 106 moves relative to the mouth 151 of the patient 105.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Appendage: As used in this disclosure, appendage is a generic term used to describe one or more limbs of a patient.

Arc: As used in this disclosure, an arc refers to a portion of a circumference or a curved perimeter. When applied to an angle, the arc also refers to a measure of an angular span as measured from a circle at the vertex formed by the sides of the angle.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Caregiver: As used in this disclosure, a caregiver is an individual who is designated to provide therapeutic services to a patient.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Distal: As used in this disclosure, distal refers to a directional sense or location of an object. Specifically, distal refers to a first object, or a side of a first object, that is distal from the medial axis, or more proximal to the side of the object, relative to a second object, or side of a second object.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Extremity: As used in this disclosure, extremity is a generic term used to describe either the hand and/or foot of a person. The extremity is located and the distal end of an appendage.

Face: As used in this disclosure, the face is the anterior portion of the head formed from the inferior surface of the mandible to the center of the frontal bone of the skull. The eyes, nose, and mouth of a person are located in the face.

Finger: As used in this disclosure, a finger is the portion of the hand that encloses the proximal phalange bone and its associated distal phalange bone of a hand. The finger nail is a claw like structure that is formed at the distal end of the finger. The finger of the hand that is formed without an intermediate phalange bone is referred to as the thumb. When sequentially numbering the fingers of the hand, the thumb is taken to be the first finger.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Guard: As used in this disclosure, a guard is an inert structure used to create a protected space.

Hand: As used in this disclosure, the hand is the extremity of the arm. The hand attaches to the wrist at the end that is distal from the shoulder. The hand comprises a plurality of metacarpal bones and a plurality of phalange bones.

Handle: As used in this disclosure, a handle is an object by which a tool, object, or door is held or manipulated with the hand.

Inferior: As used in this disclosure, inferior refers to a directional sense or location of the body. Specifically, inferior refers to an object or a side of an object that is proximal to the feet or distal from the head of the body.

Interior: As used in this disclosure, the interior is used as a relational term that implies that an object is contained within the boundary of a structure or a space.

Lateral: As used in this disclosure, lateral refers to a directional sense or location of an object or body. Specifically, lateral refers to an object or a side of an object that is proximal to the side or that is distal from the medial axis of the body. The lateral direction movement is always perpendicular to the anterior posterior axis. Lateral movement is often called sideways movement.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed is viewed from posterior side towards the anterior side. The right side of any object is the same side as the right side of the human body when the object is viewed is viewed from posterior side towards the anterior side. The left and right sides of the object remain unchanged by changes to the direction from which the object is viewed.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mandible: As used in this disclosure, the mandible is the lower jaw bone of a human being.

Medial: As used in this disclosure, medial refers to a directional sense or location of the body. Specifically, medial refers to a first object or a side of a first object that is closer to the medial axis or more distal from the side of the body relative to a second object or side of a second object.

Medial Axis: As used in this disclosure, the medial axis is the center line of the body as the line is drawn from the head to the foot. When two objects are compared relative to the medial axis, the object closer to the medial axis is referred to as the medial object and the object distal from the medial axis is referred to as the lateral object.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Offset: As used in this disclosure, an offset refers to the span of distance or cant by which two objects are out of alignment.

Offset Lateral Disk Structure: As used in this disclosure, an offset lateral disk structure refers to the juxtaposition of a first lateral face of a first disk structure to a second lateral face of a second disk structure in the manner of a lateral disk structure except that one or more of the following conditions need not be true: a) the center axes of the first prism and the second prism are no longer parallel; and, b) the congruent ends of the first prism are no longer parallel to the congruent ends of the second prism.

Offset Lateral Prism Structure: As used in this disclosure, an offset lateral prism structure refers to the juxtaposition of a first lateral face of a first prism structure to a second lateral face of a second prism structure in the manner of a lateral prism structure except that one or more of the following conditions need not be true: a) the center axes of the first prism and the second prism are no longer parallel; and, b) the congruent ends of the first prism are no longer parallel to the congruent ends of the second prism.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Palm: As used in this disclosure, the palm of the hand is identified as the portions of a left hand and a right hand between the fingers and the wrist that contact each other when the left hand presses against the right hand when the left hand and right hand are in alignment. The palm encloses the metacarpal bones of the hand. The palm of the left hand is the mirror image of the palm of the right hand. The palm encloses the metacarpal bones of the hand.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Posterior: As used in this disclosure, posterior is a term that is used to refer to the side of an object that is distal or in the opposite direction of the anterior side. When comparing two items, the posterior item is the item that is distal from the anterior of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Proximal: As used in this disclosure, the term proximal is used to describe the relative location of two objects in relation to a specified reference point. The proximal object is the object that is closer to the specified reference point.

Ring: As used in this disclosure, a ring is term that is used to describe a disk-like structure through which a negative space is formed through the faces of the disk-like structure. Rings are often considered loops.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Skull: As used in this disclosure, the skull refers to a bone structure that encloses the brain of a human body. The skull comprises six primary cranial bones and a plurality of other bones. The six primary cranial bones comprise: the frontal bone, the left parietal bone, the right parietal bone, the left temporal bone, the right temporal bone, and the occipital bone. The frontal bone forms the superior anterior enclosure of approximately anterior portions of the brain. The left parietal bone encloses the left posterior region from the superior side. The right parietal bone encloses the right posterior region from the superior side. The left temporal bone encloses the left posterior region from the inferior side. The right temporal bone encloses the right posterior region from the inferior side. The occipital bone encloses the posterior region of the brain from the inferior side. The left temple is the location of the skull where the frontal bone, the left parietal bone, and the left temporal bone are joined. The right temple is the location of the skull where the frontal bone, the right parietal bone, and the right temporal bone are joined.

Superior: As used in this disclosure, superior refers to a directional sense or location of the body. Specifically, superior refers to an object or a side of an object that is distal from the feet or proximal to the head of the body.

Transparent: As used in this disclosure, transparent refers to a material that allows light to pass through the material without significant scattering such that an object can be clearly seen through the material.

Wrist: As used in this disclosure, the wrist refers to an eight bone structure within the human body that flexibly attaches the radial bone and the ulna bone to the metacarpal bones of the hand.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dental splatter shield consisting
a guard plate, a finger ring plate, a finger ring structure, and a plate cant;
wherein the guard plate, the finger ring plate, and the finger ring structure are combined to form a structure that is configured to be worn by a caregiver;
wherein the plate cant is a cant formed between the guard plate and the finger ring plate;
wherein the structure formed by the guard plate, the finger ring plate, and the finger ring structure forms a fluid impermeable barrier that created a protected space that is configured to prevent the caregiver and a patient from exchanging biological fluids;
wherein the finger ring structure comprises a finger ring and a plurality of mounting tabs;
wherein the plurality of mounting tabs attach to the finger ring.

2. The dental splatter shield according to claim 1
wherein the guard plate is a dish shaped structure;
wherein the guard plate is a transparent structure;
wherein the guard plate is configured to form a barrier between the patient and the caregiver;
wherein the guard plate is configured to form a portion of the protected space that prevents the caregiver and the patient from exchanging biological fluids.

3. The dental splatter shield according to claim 2
wherein the finger ring plate is a dish shaped structure;
wherein the finger ring plate is a transparent structure;
wherein the finger ring plate is configured to form a barrier between the patient and the caregiver;
wherein the finger ring plate is configured to form a portion of the protected space that prevents the caregiver and the patient from exchanging biological fluids.

4. The dental splatter shield according to claim 3
wherein the guard plate comprises a first interior face, a first exterior face, and a first plurality of lateral faces;
wherein the first interior face is a congruent end of a disk structure of the guard plate;
wherein the first interior face is the face of the disk structure of the guard plate that is configured to be proximal to the patient;
wherein the first exterior face is a congruent end of the disk structure of the guard plate;
wherein the first exterior face is the face of the disk structure of the guard plate that is configured to be distal from the patient;
wherein each lateral face selected from the first plurality of lateral faces forms a portion of the lateral face structure of the disk structure of the guard plate.

5. The dental splatter shield according to claim 4
wherein the finger ring plate comprises a second interior face, a second exterior face, and a second plurality of lateral faces;

wherein the second interior face is a congruent end of a disk structure of the finger ring plate;

wherein the second interior face is the face of the disk structure of the finger ring plate that is configured to be proximal to the patient;

wherein the second exterior face is a congruent end of the disk structure of the finger ring plate;

wherein the second exterior face is the face of the disk structure of the finger ring plate that is configured to be distal from the patient;

wherein each lateral face selected from the second plurality of lateral faces forms a portion of the lateral face structure of the disk structure of the finger ring plate.

6. The dental splatter shield according to claim 5 wherein the finger ring plate attaches to the guard plate by permanently attaching a second lateral face selected from the second plurality of lateral faces to a first lateral face selected from the first plurality of lateral faces.

7. The dental splatter shield according to claim 6 wherein the finger ring structure attaches to the second interior face of the finger ring plate;

wherein the finger ring structure is configured to secure the finger ring plate to the caregiver.

8. The dental splatter shield according to claim 7 wherein the finger ring is a disk shaped structure;

wherein the finger ring is a ring shaped structure;

wherein the finger ring has a semi-enclosed shape;

wherein the finger ring is a flexible structure;

wherein the finger ring is configured to secure the finger ring plate to the caregiver.

9. The dental splatter shield according to claim 8 wherein an aperture characteristic of a semi-enclosed is formed in the lateral face of the disk structure of the finger ring.

10. The dental splatter shield according to claim 9 wherein the plurality of mounting tabs forms a fastening device;

wherein the plurality of mounting tabs fastens the finger ring to the second interior face of the finger ring plate.

11. The dental splatter shield according to claim 10 wherein the plate cant is an offset with an arc of less than 180 degrees;

wherein the plate cant is formed between the first exterior face of the guard plate and the second exterior face of the finger ring plate.

* * * * *